US012577809B2

(12) United States Patent
Ramakrishna et al.

(10) Patent No.: US 12,577,809 B2
(45) Date of Patent: Mar. 17, 2026

(54) LOCK APPARATUSES WITH SECONDARY LOCKING MECHANISMS

(71) Applicant: Schlage Lock Company LLC, Carmel, IN (US)

(72) Inventors: Manjunatha Ramakrishna, Kurubarahalli (IN); Arjun S. Kunnath, Kottayam (IN); Adithya Gangadhar Shetty, Mangalore (IN); Ramamohan Bhaskar Shettigar, Maharashtra (IN)

(73) Assignee: Schlage Lock Company LLC, Carmel, IN (US)

( * ) Notice: Subject to any disclaimer, the term of this patent is extended or adjusted under 35 U.S.C. 154(b) by 218 days.

(21) Appl. No.: 18/317,464

(22) Filed: May 15, 2023

(65) Prior Publication Data

US 2024/0384563 A1 Nov. 21, 2024

(51) Int. Cl.

| | |
|---|---|
| ***E05B 17/20*** | (2006.01) |
| ***E05B 37/02*** | (2006.01) |
| ***E05B 63/00*** | (2006.01) |
| ***E05B 67/00*** | (2006.01) |
| ***E05B 67/06*** | (2006.01) |

(52) U.S. Cl.
CPC .......... *E05B 17/2092* (2013.01); *E05B 37/02* (2013.01); *E05B 63/0004* (2013.01); *E05B 67/003* (2013.01); *E05B 67/06* (2013.01)

(58) Field of Classification Search
CPC .. E05B 17/2084; E05B 17/2092; E05B 37/02; E05B 37/025; E05B 63/0004; E05B 67/003; E05B 67/06; E05B 67/22
See application file for complete search history.

(56) References Cited

U.S. PATENT DOCUMENTS

| | | | | |
|---|---|---|---|---|
| 4,887,441 | A * | 12/1989 | Ling | E05B 37/025 70/25 |
| 5,005,384 | A * | 4/1991 | Lo | E05B 37/025 70/25 |
| 5,119,650 | A * | 6/1992 | Lo | E05B 37/025 70/25 |
| 5,560,232 | A * | 10/1996 | Chen | E05B 37/025 70/53 |
| 5,924,313 | A * | 7/1999 | Kuo | E05B 37/025 70/312 |
| 5,953,940 | A * | 9/1999 | Ling | E05B 37/025 70/20 |
| 6,508,086 | B2 * | 1/2003 | Chen | E05B 67/003 70/53 |
| 6,598,434 | B2 | 7/2003 | Yang | |
| 7,117,698 | B2 * | 10/2006 | Lai | E05B 37/025 70/21 |
| 10,392,835 | B2 * | 8/2019 | Ramakrishna | E05B 67/003 |
| 10,550,608 | B2 * | 2/2020 | Lam | E05B 63/0065 |
| 11,286,690 | B2 | 3/2022 | Ramakrishna et al. | |

(Continued)

*Primary Examiner* — Christopher J Boswell

(74) *Attorney, Agent, or Firm* — Taft Stettinius & Hollister LLP

(57) ABSTRACT

A lock apparatus generally includes a connecting portion, a housing, a primary lock, and a secondary lock. The connecting portion is engageable to the housing with a bolt assembly, and the primary lock locks the bolt assembly in the engaged position. The secondary lock arrests the bolt assembly in the engaged and locked condition in response to an attack that displaces the primary lock from a nominal configuration.

16 Claims, 11 Drawing Sheets

(56) References Cited

U.S. PATENT DOCUMENTS

| | | | |
|---|---|---|---|
| 12,031,353 B2 | 7/2024 | Townsend et al. | |
| 2004/0011098 A1 | 1/2004 | Yang | |
| 2005/0044903 A1 * | 3/2005 | Ling | E05B 67/02<br>70/30 |
| 2007/0234765 A1 * | 10/2007 | Tsai | E05B 37/025<br>70/30 |

* cited by examiner

LOCK APPARATUSES WITH SECONDARY LOCKING MECHANISMS

TECHNICAL FIELD

The present disclosure generally relates to lock apparatuses, and more particularly but not exclusively relates to lock apparatuses that include a secondary locking mechanism in addition to a primary locking mechanism.

BACKGROUND

Lock apparatuses are often used to deter theft of portable objects, such as bicycles, and to prevent unauthorized access to secure spaces. Such lock apparatuses can be portable, and typically include a shackle or chain operable to surround a portion of the object or objects to be secured. At least a portion of the shackle or chain is selectively locked to a crossbar or housing to form a hoop surrounding the object(s) to thereby lock the object or to lock two or more objects to one another.

Certain lock apparatuses that secure one or more bolts in a crossbar or housing in the locked position have a weak point, or multiple weak points, that can be forcibly attacked and displaced to unlock the one or more locks, such as at the dials of a dial-based combination lock. If the weak point is attacked and damaged or displaced by force, the deadbolt can be retracted and allow the lock apparatus to be removed. Therefore, existing lock apparatuses suffer from one or more drawbacks or limitations, such as those relating to ease of use, security, and strength. For these reasons among others, there remains a need for further improvements in this technological field.

SUMMARY

An exemplary lock apparatus generally includes a connecting portion that extends around one or more objects, and a housing such as a crossbar that is connected to both ends of the connecting portion to form a loop. The housing includes a primary lock to lock at least one end of the connecting portion to the housing, and a secondary lock that maintains the at least one end of the connecting portion in a locked condition in the housing in response to a forcible attack on the primary lock.

In certain embodiments, the connecting portion is a chain, cable, shackle, bar, or other device configured to engage one or more objects to be locked with the lock apparatus and/or locked together with the lock apparatus. In certain embodiments, the primary lock is a dial-based combination lock. In certain embodiment, the secondary lock arrests one or more bolts to maintain engagement of the one or more bolts in a locked position with the connecting portion in the housing. Further embodiments, forms, features, and aspects of the present application shall become apparent from the description and figures provided herewith.

DETAILED DESCRIPTION OF ILLUSTRATIVE EMBODIMENTS

Figure 1:
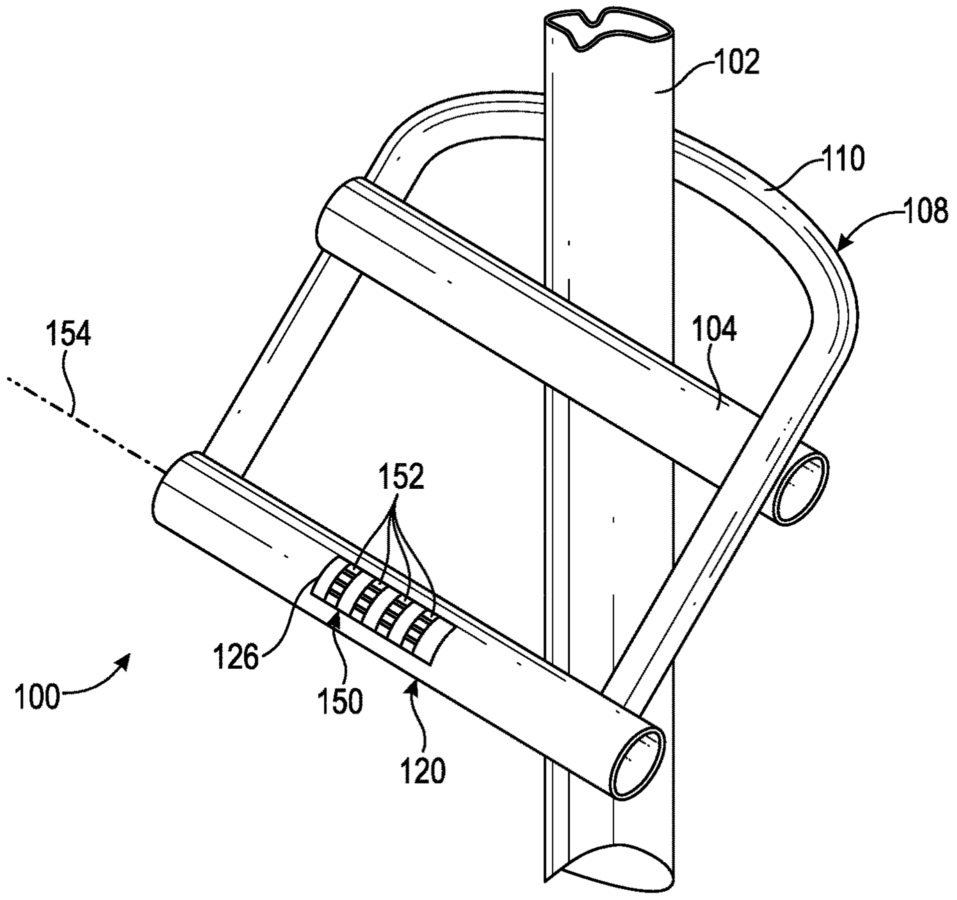
FIG. 1 is a perspective view showing a lock apparatus securing a pair of objects to one another according to an embodiment of the present disclosure.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a lock apparatus 100 according to certain embodiments. The lock apparatus 100 generally includes a connecting portion 108 and a housing 120, such as a crossbar. The connecting portion 108 is configured to extend at least partially around one or more objects, such as first object 102 and second object 104, to form a loop. The connecting portion 108 and housing 120 are operable to form a loop around objects 102, 104 and are selectively locked together to prevent removal of at least a portion of the connecting portion 108 from housing 120.

Figure 2:
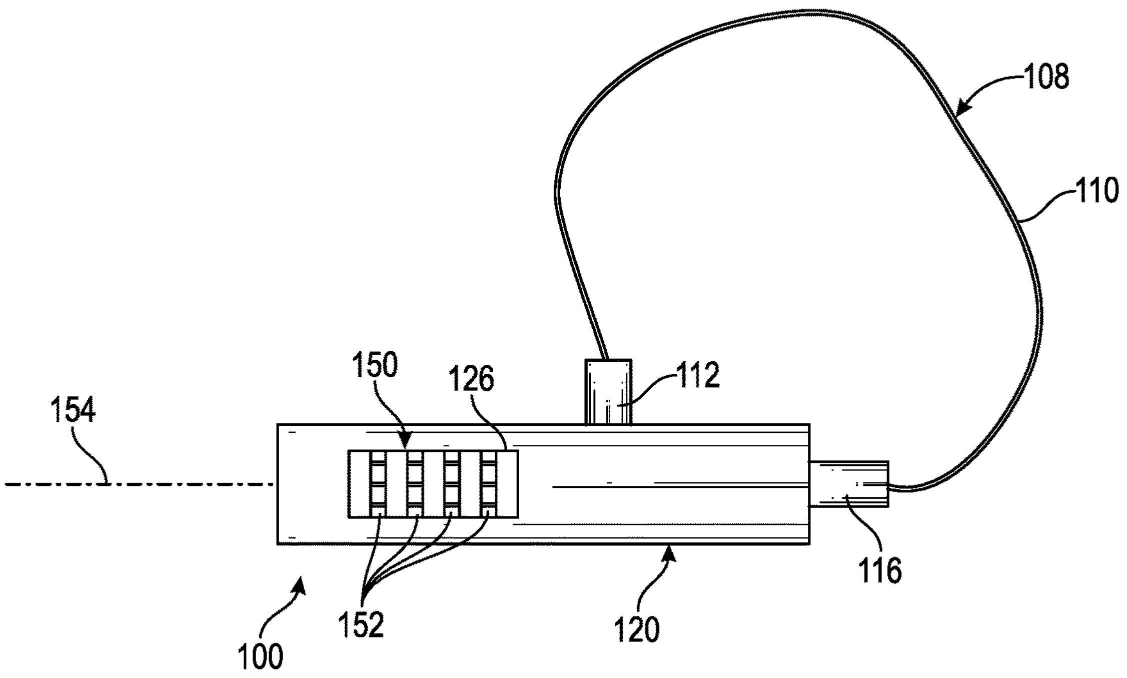
FIG. 2 is another embodiment lock apparatus for securing one or more objects.

In FIG. 1 the connecting portion 108 includes a body 110 in the form of a shackle. In FIG. 2, the connecting portion 108 includes a body 110 in the form of a flexible member. Various forms for connecting portion 108 are contemplated, including shackles, chains, cables, rods, bars, straps, etc. Housing 120 is in the form of a crossbar in FIGS. 1-2, but other types of housings are also contemplated, including rectangular housings, cylindrical housings, padlock type housings, etc. Lock apparatus 100 may include additional features and/or components not described herein, such as disclosed in U.S. Patent App. Pub. No. 2023/0008382 which is incorporated herein by reference.

Figure 3:
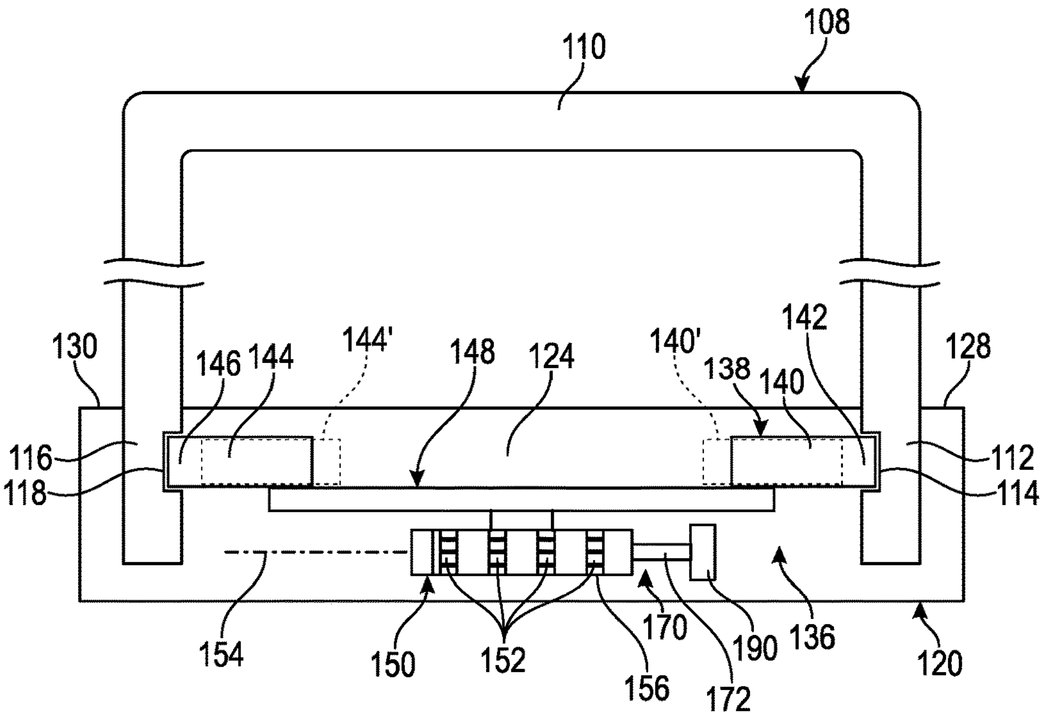
FIG. 3 is a schematic view showing a lock apparatus having a bolt assembly in a locked position, a primary lock in a nominal configuration, and a secondary lock.
Figure 4:
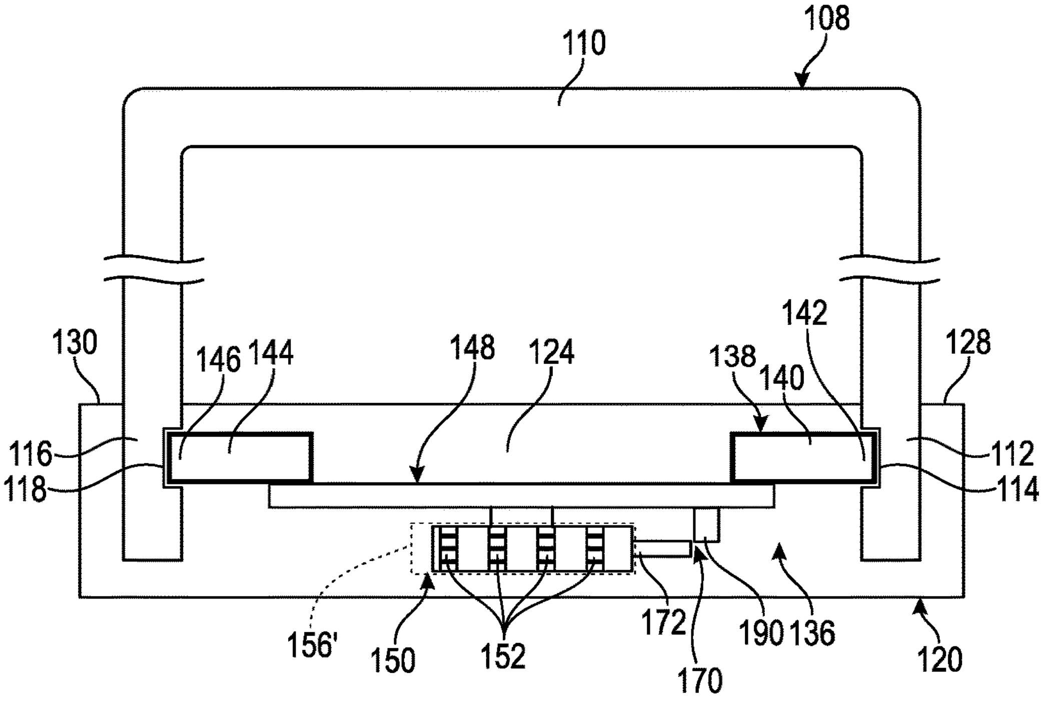
FIG. 4 is a schematic view showing of the lock apparatus of FIG. 3 with the primary lock displaced from its nominal configuration and the secondary lock arresting the bolt assembly in the locked position.
Figure 5:
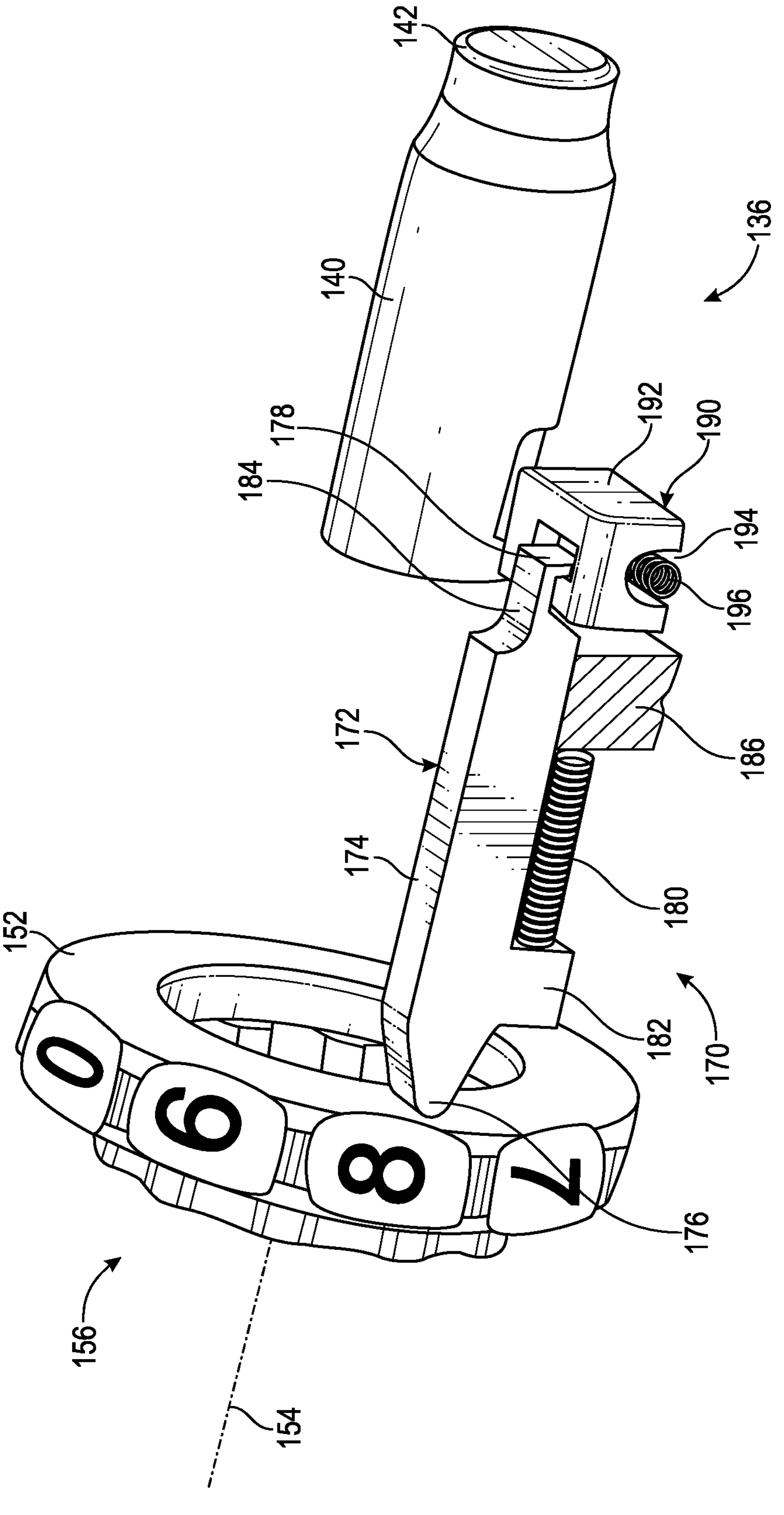
FIG. 5 is a perspective view of a part of another embodiment of the lock apparatus including a primary lock, a secondary lock, and a bolt assembly in a locked position.
Figure 6:
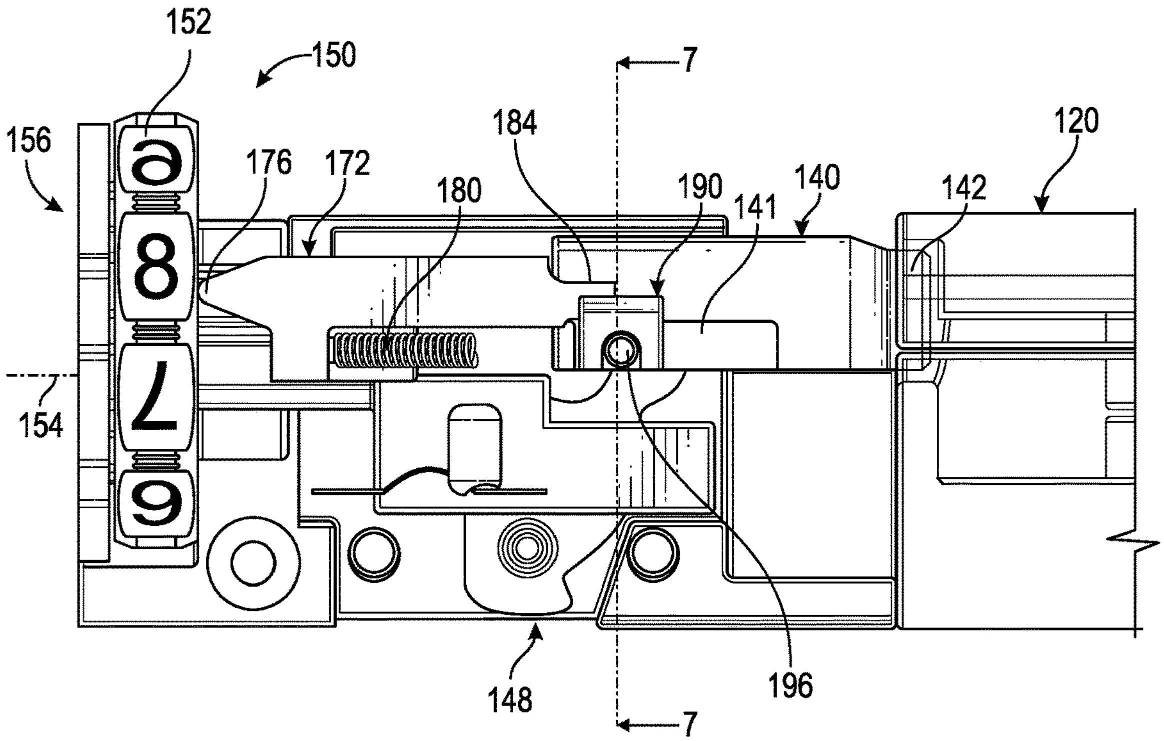
FIG. 6 is an elevation view of the embodiment of FIG. 5.
Figure 7:
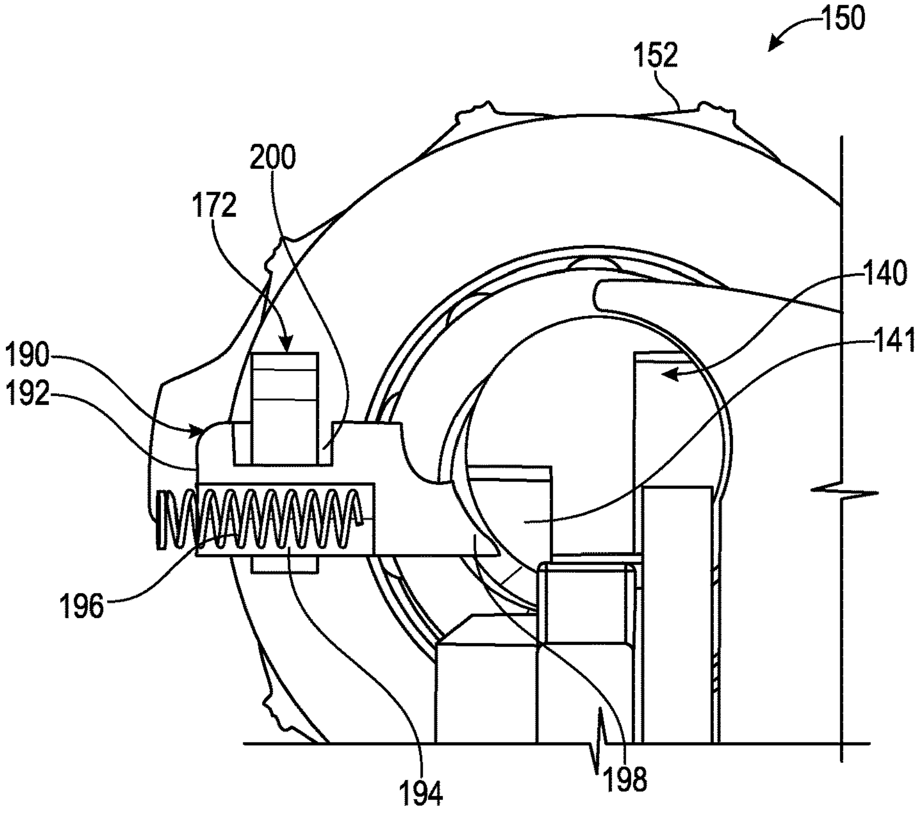
FIG. 7 is a section view along line 7-7 of FIG. 6.
Figure 8:
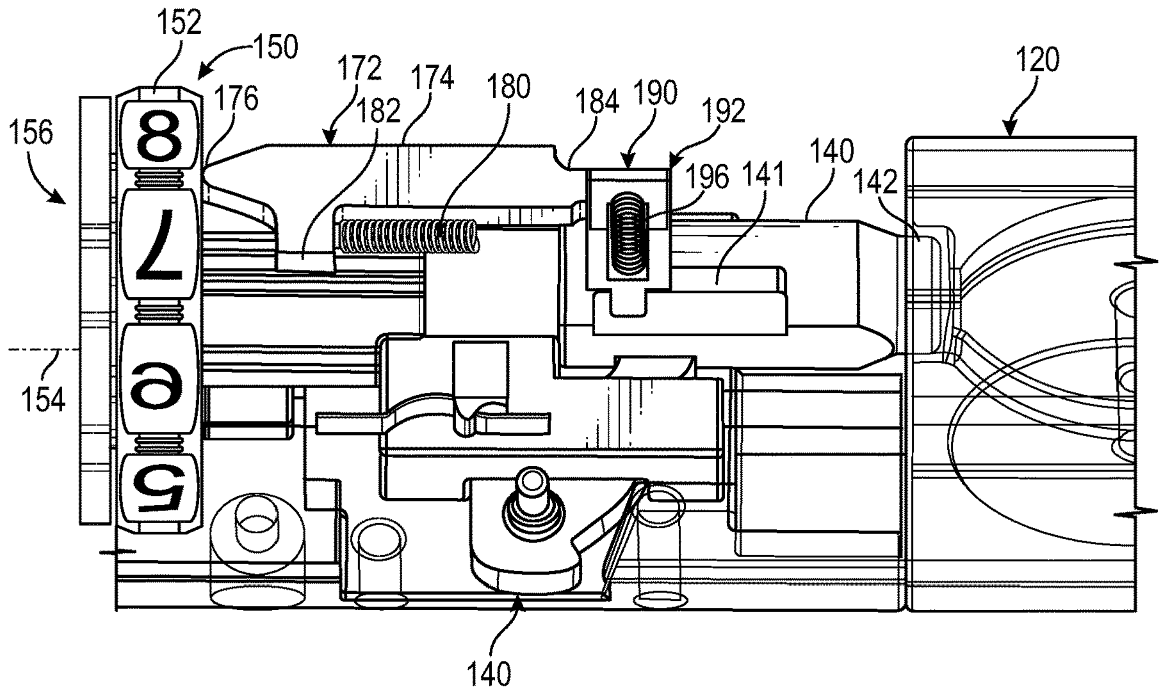
FIG. 8 is another elevation view of the embodiment of FIG. 5 with the bolt in a locked position.
Figure 9:
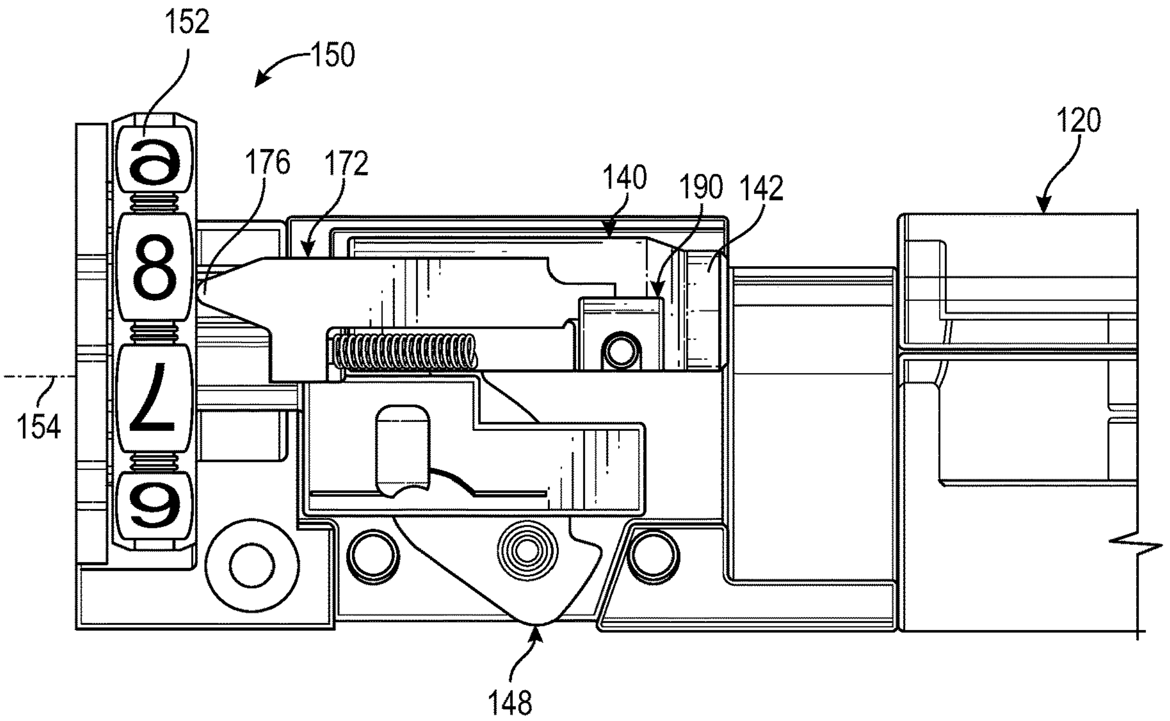
FIG. 9 is an elevation view of the embodiment of FIG. 5 with the bolt in an unlocked position.
Figure 10:
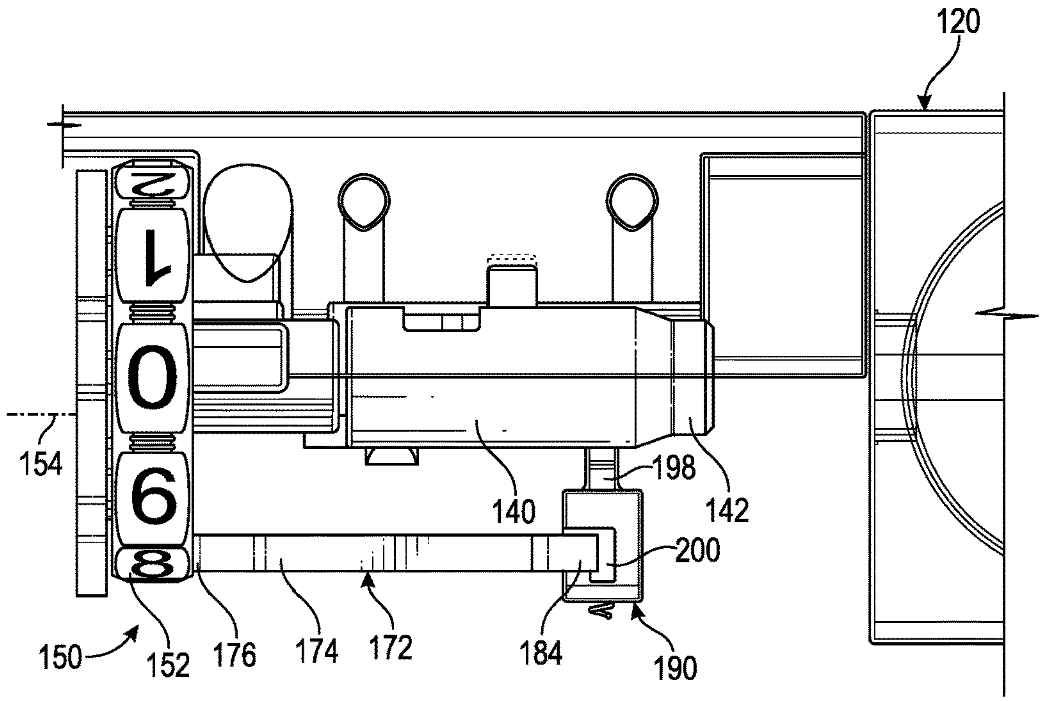
FIG. 10 is another elevation view of the embodiment of FIG. 5 with the bolt in an unlocked position.

Referring further to FIGS. 3-4, housing 120 includes a primary lock 150 that is operable by the user to lock and unlock the lock apparatus 100. In the illustrated embodiment, primary lock 150 is a dial-based combination lock including a plurality of dials 152 movable around a rotation axis 154 between the locked condition and the unlocked condition while in the nominal configuration. As used herein, the nominal configuration includes primary lock 150 being situated on and/or within housing 120 at its intended location and orientation, and operable as intended to lock and unlock connecting portion 108 while in the nominal configuration. A forcible attack on primary lock 150 is one that displaces primary lock 150 it from its nominal configuration to an abnormal position or condition that potentially allows unauthorized unlocking of lock apparatus 100. This unauthorized unlocking is countered by a secondary locking mechanism 136, as discussed further below.

Housing 120 includes an exterior window 126 that receives and provides access to primary lock 150. Housing 120 also includes a compartment 124 that contains secondary lock mechanism 136, a bolt assembly 138, and a bolt actuating mechanism 148. Connecting portion 108 includes a body 110 extending between a first foot 112 and a second foot 116. First foot 112 is positionable in first opening 128 of housing 120, and second foot 116 is positionable in second opening 130 of housing 120. Bolt actuating mechanism 148 is operable to move bolt assembly 138 between a locked position in engagement with first foot 112 and/or with second foot 116, and an unlocked position disengaged from first foot 112 and/or from second foot 116.

In other embodiments, one of the feet 112, 116 is not removably engaged to housing 120. For example, the embodiment of FIG. 2 only includes one end or foot 112 of connecting portion 108 that is removably engageable to and lockable/unlockable with housing 120, and the other end or second foot 116 is non-removably secured to housing 120. The second foot 116 can be fixed, hinged, rotatable, or pivotal relative to housing 120 to facilitate the locking of objects 102, 104. In these embodiments, bolt actuating mechanism 148 is operable to move bolt assembly 138 between a locked position in engagement with first foot 112 or second foot 116, and an unlocked position disengaged from first foot 112 or second foot 116.

In the illustrated embodiment of FIG. 3, bolt assembly 138 includes a first bolt 140 having a first nose 142, and a second bolt 144 having a second nose 146. First foot 112 includes a first notch 114, and second foot 116 includes a second notch 118. First bolt 140 and/or second bolt 144 are movable by bolt actuating mechanism 148 between a locked position in which first nose 142 is received in first notch 114 and second nose 146 is received in second notch 118, and an unlocked position in which first and second bolts 140, 144 are displaced (as indicated by dashed lines and reference numerals 140', 144') to an unlocked position in which noses 142, 146 is disengaged from notches 114, 118, respectively.

Bolt actuating mechanism 148 can link or connect first and second bolts 140, 144 together, or can be separately connected to first bolt 140 and to second bolt 144. Bolt actuating mechanism 148 can include a spindle, springs, triggers, releases, or other devices to facilitate retraction of bolts 140, 144 from the locked position to the unlocked position. In addition, other configurations for bolts 140, 144 and feet 112, 116 are also contemplated, so long as at least one bolt is provided that can lockingly engage at least one foot.

In FIG. 3, primary lock 150 is in its nominal configuration 156 and is operable to be manipulated from a locked condition in which bolt assembly 138 is maintained in its locked position to an unlocked condition in which bolt assembly 138 is operable to be displaced to its unlocked position, such as by using a trigger or slider (not shown) engaged to bolt actuating mechanism 148.

In addition, secondary locking mechanism 136 includes a secondary lock 170 referenced to the nominal configuration 156 of primary lock 150 of FIG. 3. As a result, secondary lock 170 is maintained in a deactivated condition during normal use of lock apparatus 100 while primary lock 150 remains in its nominal configuration 156. In other embodiments, secondary lock 170 is referenced to one or more other components of housing 120 that are determined or designed to be the weakest component and most likely to be displaced in response to a forcible attack on lock apparatus 100, and is not necessarily limited to being referenced to primary lock 150.

Referring to FIG. 4, primary lock 150 has been displaced from its nominal configuration 156 by a forcible attack to a displaced or abnormal configuration 156'. Secondary lock 170 is now activated since it is referenced to be deactivated only while primary lock 150 is in the nominal configuration 156. As a result, secondary lock 170 is activated and engages at least one of bolt assembly 138 and bolt actuating mechanism 148 to arrest first bolt 140 and/or second bolt 144 in its locked position in engagement with first foot 112 and/or second foot 116.

In an embodiment, secondary lock 170 includes a plunger 172 referenced to the nominal configuration 156 of primary lock 150. In this position, secondary lock 170 is deactivated and plunger 172 retains blocking device 190 in a disengaged or displaced position from bolt 140, bolt 144, bolt assembly 138, and/or bolt actuating mechanism 148. Displacement of primary lock 150 from nominal configuration 156 causes plunger 172 to be displaced, which releases blocking device 190 to activate blocking device 190 to a blocking position in engagement with bolt 140, bolt 144, bolt assembly 138, and/or bolt actuating mechanism 148 to arrest first bolt 140 and/or second bolt 144 in the locked position.

Referring to FIGS. 5-13, an embodiment of secondary lock 170 is shown with reference to first bolt 140 and primary lock 150. It should be understood that, as discussed above, secondary lock 170 can be referenced to primary lock 150 and/or one or more other components, and can directly or indirectly contact bolt 140, bolt assembly 138, and/or bolt actuating mechanism 148. In addition, multiple secondary locks 170 can be provided, such as a separate secondary lock 170 for each bolt.

Primary lock 150 includes one or more dials 152 that are normally rotatable around a rotation axis 154 to lock and unlock lock apparatus 100 while primary lock 150 is in its nominal configuration 156, as shown in FIGS. 5-10. Displacement of a dial or dials 152 transversely to or along rotation axis 154 in an abnormal direction or directions, as indicated by arrows 158 and shown in FIGS. 11-13, activates the secondary lock 170 to arrest bolt 140, bolt assembly 138, and/or bolt actuating mechanism 148 in a locked position.

Plunger 172 includes an elongated plunger body 174 extending between a first end 176 and an opposite second end 178. Body 174 includes a projecting flange 182 near first end 176, and a tail 184 near second end 178. Plunger spring 180 is positioned between flange 182 and an internal wall or abutment 186 of or in housing 120 in order to bias first end 176 toward or against dial 152 of primary lock 150.

Blocking device 190 includes a block-shaped or plate-shaped body 192 that defines a receptacle 194 for receiving blocking device spring 196. Blocking device spring 196 biases a projecting arm 198 of body 192 toward bolt 140. However, while dial 152 is in its nominal configuration 156, tail 184 of plunger 172 is positioned in cutout 200 of blocking device 190 to retain projecting arm 198 in spaced relation from bolt 140. This allows bolt 140 to move between a locked position shown in FIGS. 6-8 and an unlocked condition shown in FIGS. 9-10.

Figure 11:
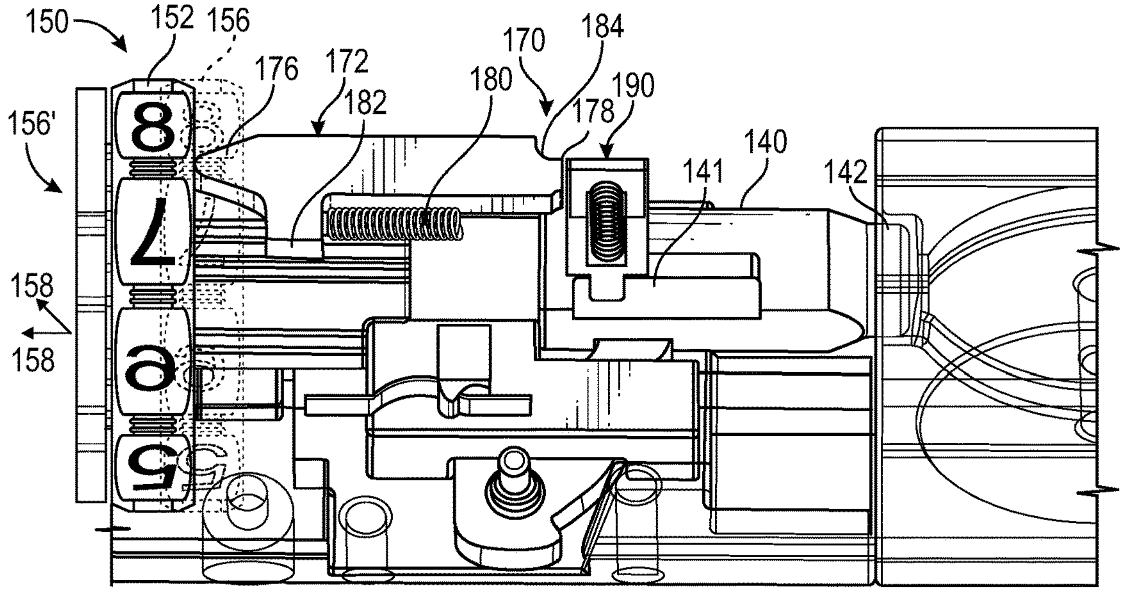
FIG. 11 is an elevation view of the embodiment of FIG. 5 showing the primary lock displaced from its nominal configuration and the secondary lock arresting the bolt in the locked position.
Figure 12:
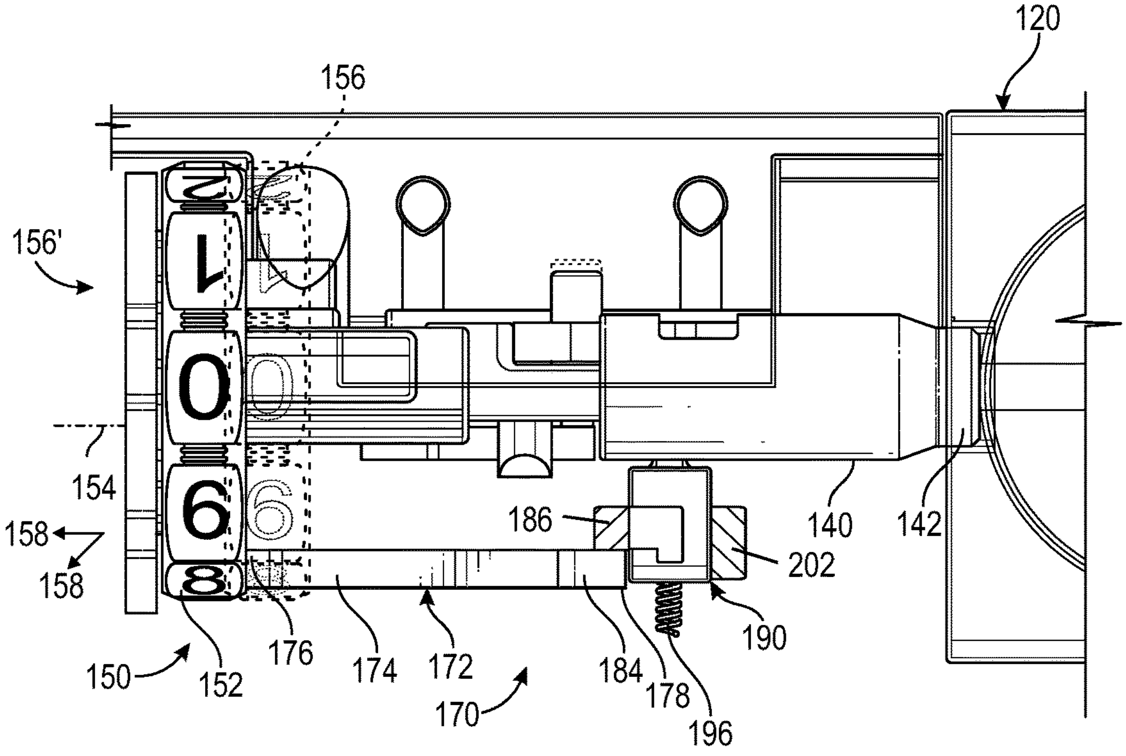
FIG. 12 is another elevation view similar to FIG. 11 with the bolt arrested in the locked position.
Figure 13:
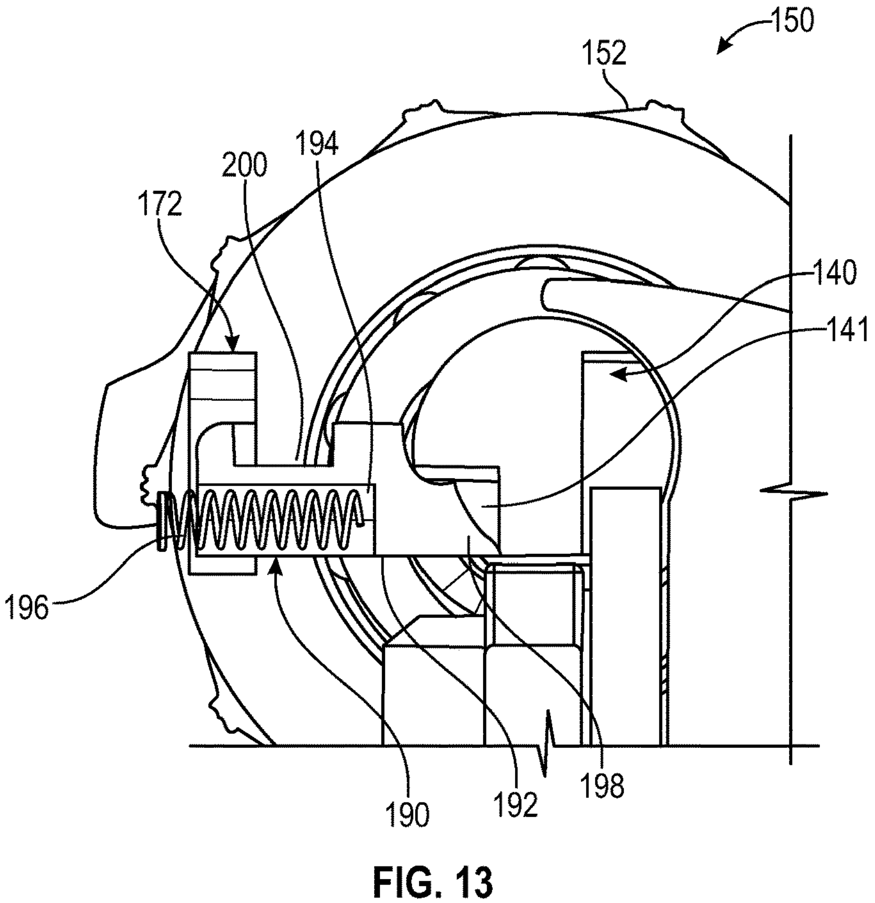
FIG. 13 is a section view of FIG. 11 with the bolt arrested in the locked position.
Figure 14:
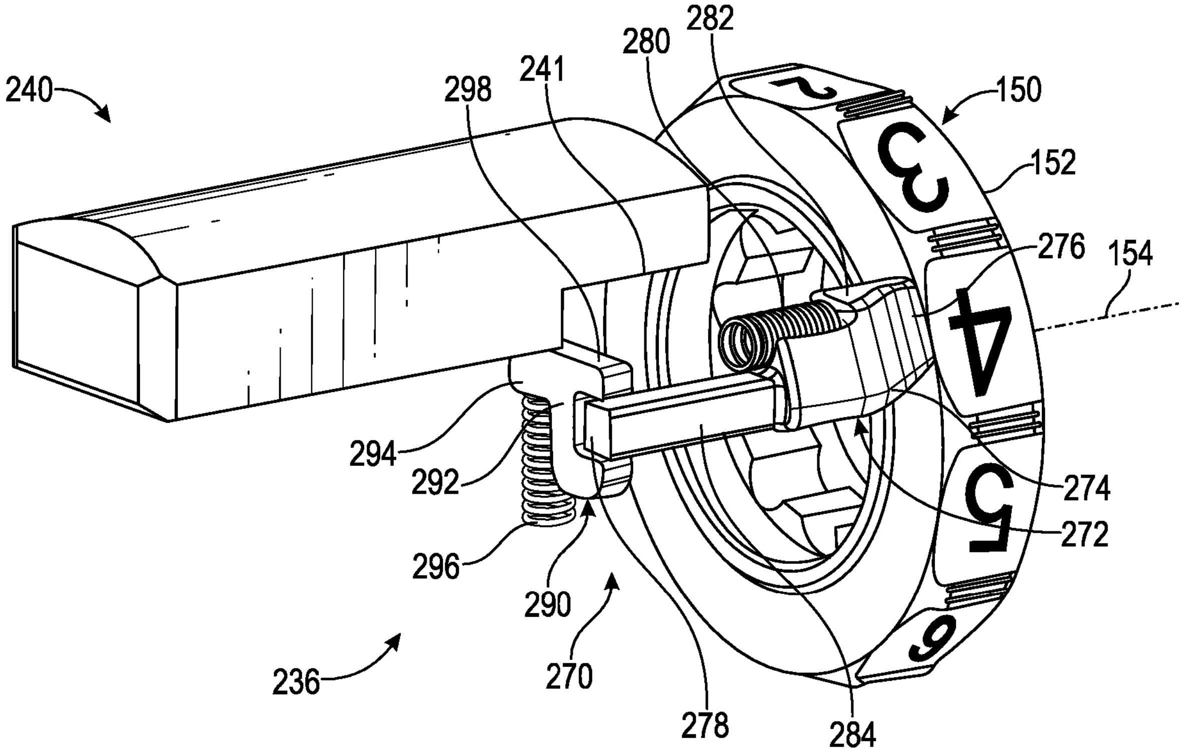
FIG. 14 is a perspective view of a portion of another embodiment of the lock apparatus including a primary lock, a secondary lock, and bolt assembly in a locked position.
Figure 15:
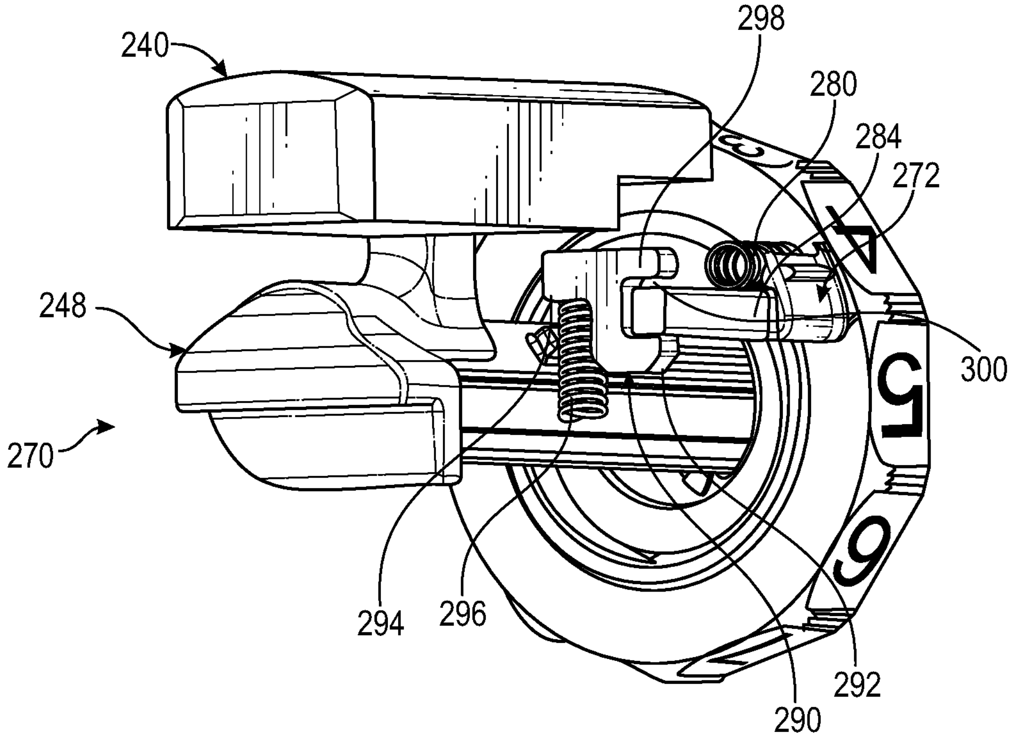
FIG. 15 is another perspective view of the embodiment of FIG. 14.
Figure 16:
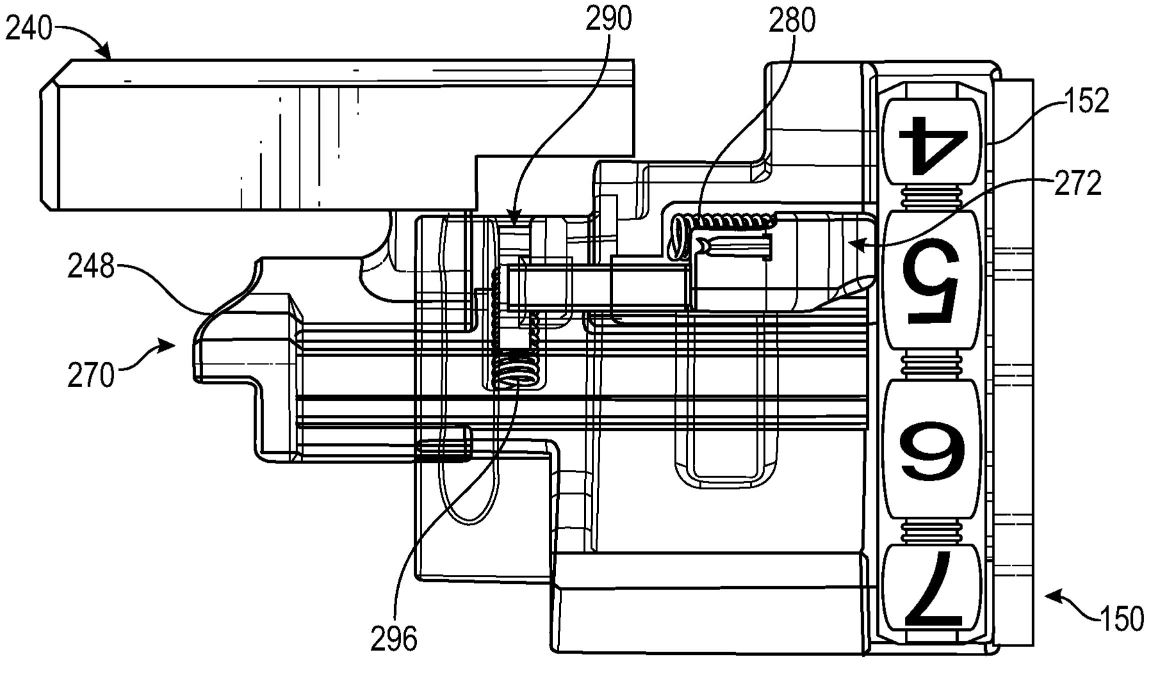
FIG. 16 is an elevation view of the embodiment of FIG. 14.
Figure 17:
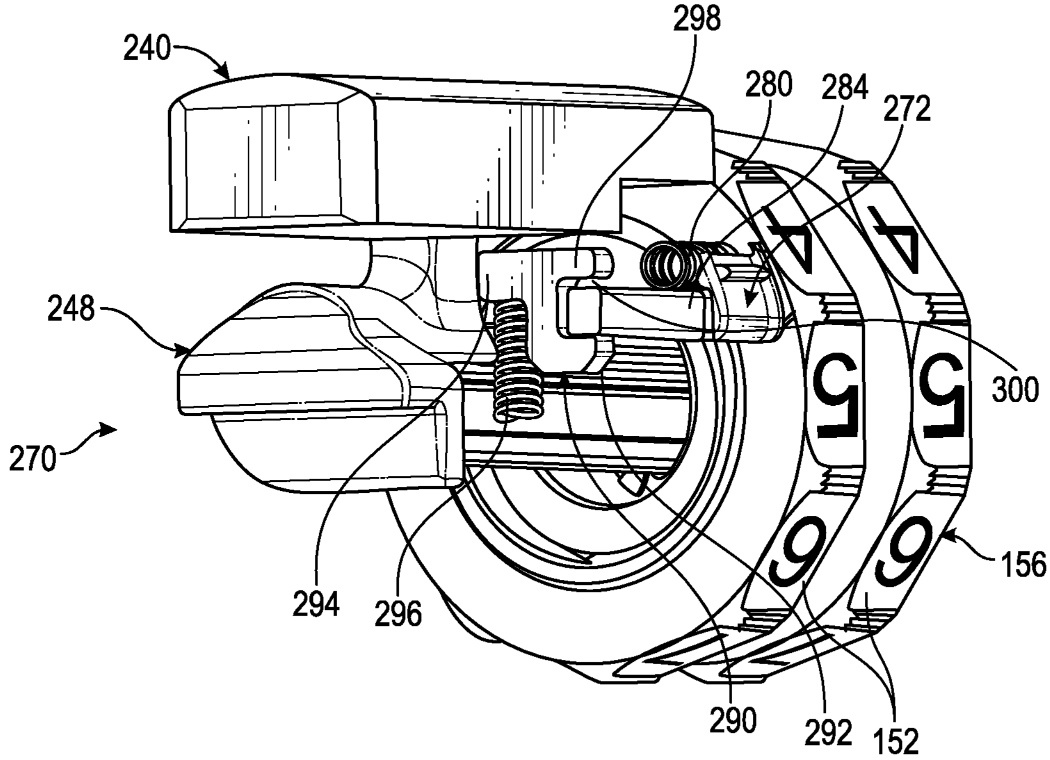
FIG. 17 is a perspective view of the embodiment of FIG. 14 with the bolt in an unlocked position.
Figure 18:
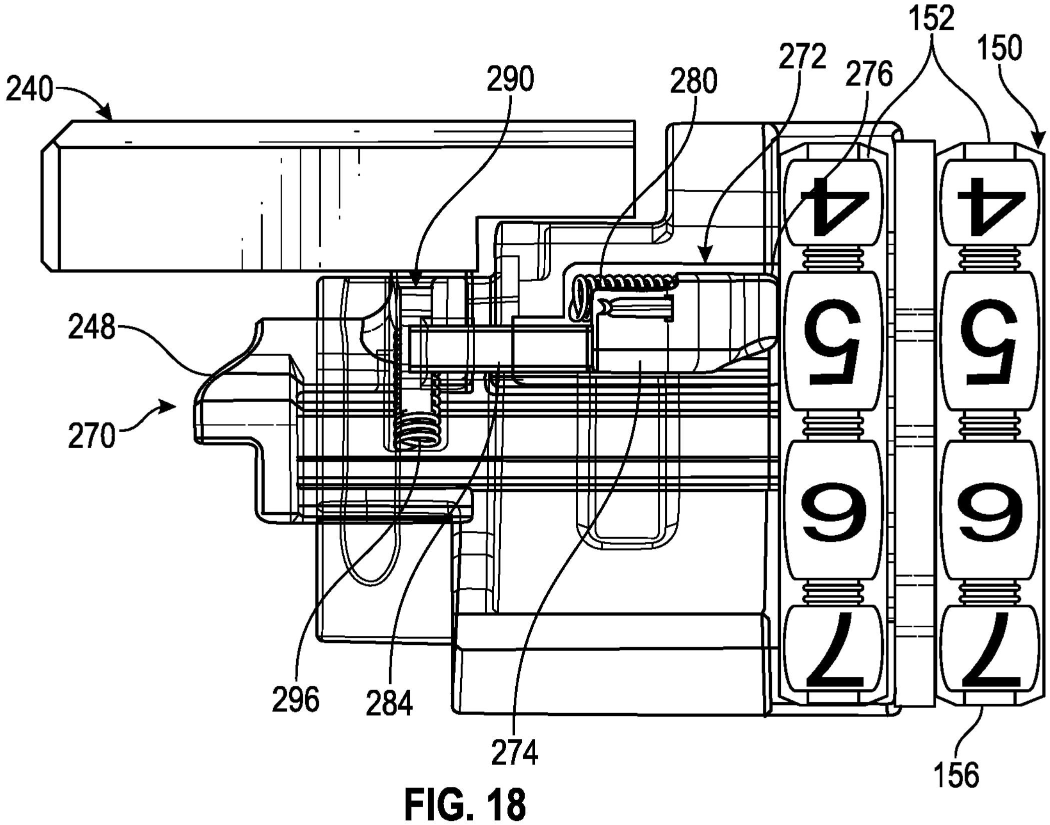
FIG. 18 is an elevation view of the embodiment of FIG. 14 with the bolt in an unlocked position.

When dial 152 is displaced from its nominal configuration, as shown in FIGS. 11-13, plunger spring 180 displaces plunger 172 along rotation axis 154, which removes tail 184 from cutout 200, allowing blocking device spring 196 to displace blocking device 190 so that projecting arm 198 engages bolt 140 to arrest bolt 140 in the locked position. In an embodiment, projecting arm 198 is received in a notch or groove 141 formed in a cylindrical outer wall of first bolt 140. Body 192 is retained in an arresting position by contacting internal walls 186 and/or support structure 202 (FIG. 12) of housing 120 or of a component in housing 120.

Referring to FIGS. 14-20, another embodiment of secondary lock 170 is shown and designated as secondary lock 270. Secondary lock 270 is shown with another embodiment first bolt 240 and primary lock 150. It should be understood that, as discussed above, secondary lock 270 can be referenced to primary lock 150 and/or one or more other components in housing 120, and can directly or indirectly contact bolt 240, bolt assembly 138, and/or bolt actuating mechanism 148 to arrest bolt 240. In addition, multiple secondary locks 270 can be provided, with one secondary lock 270 for each bolt.

Primary lock 150 includes one or more dials 152 that are normally rotatable around rotation axis 154 to lock and unlock lock apparatus 100 while primary lock 150 is in its nominal configuration 156, as shown in FIGS. 14-18. Displacement of a dial or dials 152 transversely to or along rotation axis 154 in an abnormal direction or directions, as indicated by arrows 158 and shown in FIGS. 19-20, activates the secondary lock 270 to arrest bolt 240 in a locked position.

Secondary lock 270 includes plunger 272 and blocking device 290. Plunger 272 includes an elongated plunger body 274 extending between a first end 276 and an opposite second end 278. Body 274 includes a pocket 282 near first end 276, and a tail 284 near second end 278. Plunger spring 280 is positioned in pocket 282 and an internal wall or support 286 in housing 120 in order to bias first end 276 toward or against dial 152 of primary lock 150.

Blocking device 290 includes a J-shaped or plate-shaped body 292 that includes a projecting arm 298. Projecting arm 298 defines a lip 294 for contacting blocking device spring 296. Blocking device spring 296 biases projecting arm 298 of body 292 toward bolt 240. However, while dial 152 is in its nominal configuration, tail 284 of plunger 272 is positioned in cutout 300 of blocking device 290 to retain projecting arm 298 in spaced relation from bolt 240. This allows bolt 240 to move between a locked position shown in FIGS. 14-16 and an unlocked position shown in FIGS. 17-18.

Figure 19:
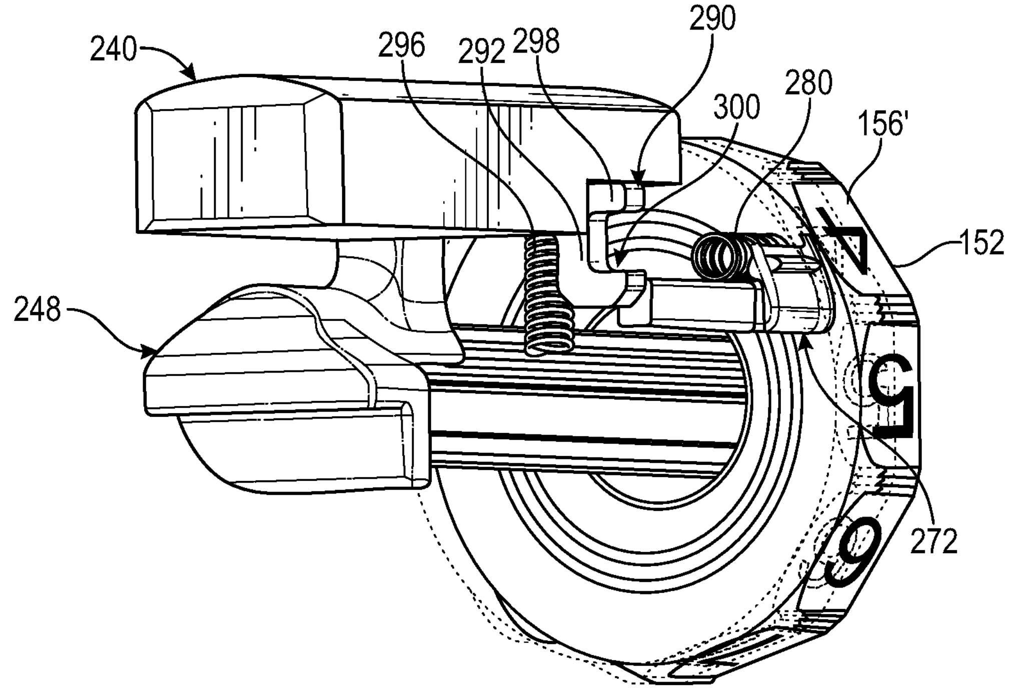
FIG. 19 is a perspective view of the embodiment of FIG. 14 showing the primary lock displaced from its nominal configuration and the secondary lock arresting the bolt in the locked position.
Figure 20:
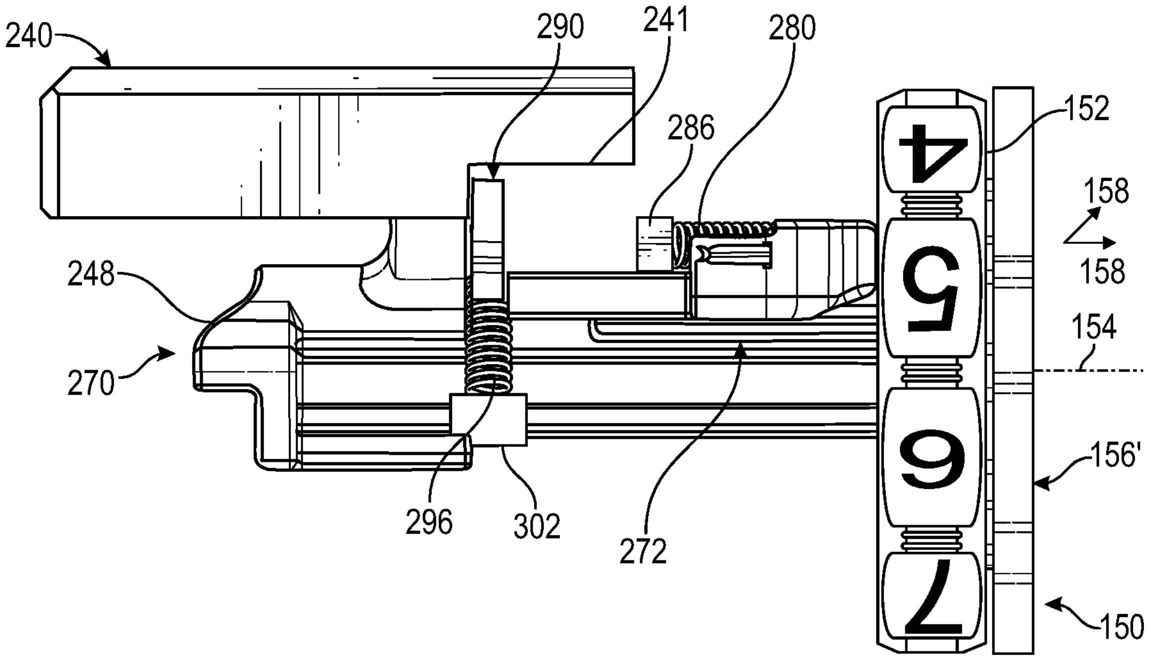
FIG. 20 is an elevation view similar to FIG. 17 with the bolt arrested in the locked position.

When dial 152 is displaced from its nominal configuration, as shown in FIGS. 19-20, then plunger spring 280 displaces plunger 272 along rotation axis 154, which removes tail 284 from cutout 300, allowing blocking device spring 296 to displace blocking device 290 so that projecting arm 298 engages bolt 240 to arrest bolt 240 in the locked position. In an embodiment, projecting arm 298 is received in a notch or groove 241 formed along one side of a rectangular or polygonal-shaped body of first bolt 240. Body 292 is retained in an arresting position by contacting internal walls 186 and/or support structure 202 of housing 120.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lock apparatus, comprising:

a connecting portion positionable around one or more objects to be locked, the connecting portion including a first foot and a second foot; and a housing connected to the first foot and to the second foot, wherein the housing includes:

a bolt movably mounted in the housing for movement between a locked position in which the bolt is engaged to the first foot, and an unlocked position in which the bolt is movable to disengage from the first foot;

a primary lock having a nominal configuration on the housing, wherein in the nominal configuration the primary lock is movable between a locked condition in which the primary lock maintains the bolt in the locked position, and an unlocked condition in which the bolt is operable to move from the locked position, wherein the primary lock is a dial-based combination lock including a plurality of dials movable around a rotation axis between the locked condition and the unlocked condition while in the nominal configuration; and a secondary lock mounted in the housing, the secondary lock configured to arrest the bolt in the locked condition in response to forcible displacement of the primary lock from the nominal configuration, wherein the secondary lock includes a blocking device and a plunger engaged to the blocking device, wherein the plunger is biased into engagement with the at least one of the plurality of dials, and the blocking device is biased toward the bolt, and wherein the plunger and the blocking device have:

a first position in which the plunger is engaged with at least one of the plurality of dials to maintain the plunger and blocking device in the first position; and a second position in which forcible displacement of one or more of the plurality of dials from the nominal configuration disengages the plunger from the blocking device to allow the blocking device to move to a position that arrests the bolt in the locked condition.

2. The lock apparatus of claim 1, further comprising:

a plunger spring engaged to the plunger to bias the plunger into engagement with at least one of the plurality of dials; and a blocking device spring engaged to the housing and the blocking device that biases to bias the blocking device toward the bolt.

3. The lock apparatus of claim 2, wherein the plunger includes an elongated body and a plunger flange extending transversely to the elongated body, and wherein the plunger spring is engaged to the plunger flange.

4. The lock apparatus of claim 3, wherein the blocking device includes a body that forms a receptacle, and wherein the blocking device spring is engaged to the blocking device in the receptacle.

5. The lock apparatus of claim 3, wherein the blocking device includes a body that includes a projecting arm, and wherein the blocking device spring is engaged to the projecting arm of the blocking device.

6. The lock apparatus of claim 1, wherein:

the plunger includes an elongated body extending from a first end that engages the at least one of the plurality of dials to an opposite second end; and the blocking device includes a cutout that receives the elongated body of the plunger to maintain the blocking device in the first position.

7. The lock apparatus of claim 1, wherein the connecting portion is one of a chain, cable, shackle or bar.

8. A lock apparatus, comprising:

a connecting portion positionable around one or more objects to be locked, the connecting portion including a first foot and a second foot; and a housing connected to the first foot and to the second foot, wherein the housing includes:

a first bolt movably mounted in the housing for movement between a locked position in which the first bolt is engaged to the first foot, and an unlocked position in which the first bolt is movable to disengage from the first foot;

a second bolt movably mounted in the housing for movement between a locked position in which the second bolt is engaged to the second foot, and an unlocked position in which the second bolt is movable to disengage from the second foot;

a primary lock having a nominal configuration on the housing, wherein in the nominal configuration the primary lock is movable between a locked condition in which the primary lock maintains the first bolt in the locked position, and an unlocked condition in which the first bolt is operable to move from the locked position; and a secondary lock mounted in the housing, the secondary lock configured to arrest the first bolt in the locked condition in response to forcible displacement of the primary lock from the nominal configuration.

9. The lock apparatus of claim 8, wherein the secondary lock is configured to arrest each of the first and second bolts in the locked condition in response to the forcible displacement of the primary lock from the nominal configuration.

10. The lock apparatus of claim 8, further comprising a second secondary lock mounted in the housing that is configured to arrest the second bolt in the locked condition in response to the forcible displacement of the primary lock from the nominal configuration.

11. A lock apparatus, comprising:

a connecting portion for positioning around one or more objects to be locked, the connecting portion having first and second ends;

a housing that is connected to the first and second ends, at least one of the first and second ends being removably engaged to the housing with a movable bolt assembly housed in the housing;

a primary lock having a nominal configuration relative to the housing, wherein the primary lock is movable between a locked condition in which the primary lock maintains the bolt assembly in a locked position in engagement with the at least one of the first and second ends, and an unlocked condition in which the bolt assembly is operable to move from the locked position to disengage the at least one of the first and second ends, and wherein the primary lock is a dial-based combination lock including a plurality of dials movable around a rotation axis between the locked condition and the unlocked condition while in the nominal configuration; and a secondary lock in the housing, the secondary lock configured to arrest the bolt assembly in the locked position in response to failure of the primary lock in maintaining the bolt assembly in the locked position, wherein:

the secondary lock includes a blocking device and a plunger engaged to the blocking device;

the plunger and the blocking device have a first position in which the plunger is engaged with at least one of the plurality of dials to maintain the plunger and the blocking device in the first position; and the plunger and the blocking device have a second position in which forcible displacement of one or more of the plurality of dials from the nominal configuration disengages the plunger from the blocking device to allow the blocking device to move to a position that arrests the bolt assembly in the locked condition, and wherein the plunger is biased into engagement with the at least one of the plurality of dials and the blocking device is biased toward the bolt assembly.

12. The lock apparatus of claim 11, wherein the plunger is referenced to the nominal configuration of the primary lock; and wherein the blocking device is held in the first position by the plunger while the plunger is referenced to the nominal configuration, and wherein the blocking device is released by the plunger to arrest the bolt assembly in the locked position in response to the primary lock being forcibly displaced from the nominal configuration.

13. The lock apparatus of claim 12, wherein the bolt assembly includes at least one bolt that contacts the at least one of the first and second ends of the connecting portion in the housing, and wherein the blocking device directly engages the bolt to arrest the bolt assembly in the locked position.

14. The lock apparatus of claim 12, wherein the plunger is biased into engagement with the primary lock, and wherein the plunger maintains the blocking device in the first position relative to the bolt assembly while the primary lock is in the nominal configuration.

15. The lock apparatus of claim 14, wherein the plunger is displaced in response to the forcible displacement of the one or more of the plurality of dials from the nominal configuration, and wherein displacement of the plunger releases the blocking device from the first position to arrest the bolt assembly in the locked position.

16. The lock apparatus of claim 15, wherein:

the blocking device includes a plate-like body with a first portion and a second portion extending from the first portion, the first portion having a cutout to receive the plunger when the blocking device is in the first position, and wherein the second portion includes a projecting arm that engages the bolt assembly when released from the first position; and the plunger includes an elongated body extending from a first end to a second end, the first end contacting the primary lock, and wherein the second end extends into the cutout of the blocking device.

* * * * *